(12) United States Patent
Agarwal et al.

(10) Patent No.: US 12,445,991 B2
(45) Date of Patent: Oct. 14, 2025

(54) METHODS AND SYSTEMS FOR MANUAL MODE SEARCH FOLLOWING A DISASTER CONDITION

(71) Applicant: Samsung Electronics Co., Ltd., Suwon-si (KR)

(72) Inventors: Aman Agarwal, Bangalore (IN); Lalith Kumar, Bangalore (IN); Kailash Kumar Jha, Bangalore (IN); Samiran Bhowmik, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 17/664,030

(22) Filed: May 18, 2022

(65) Prior Publication Data
US 2022/0377694 A1   Nov. 24, 2022

(30) Foreign Application Priority Data

May 19, 2021   (IN) .............................. 202141022484
Apr. 28, 2022   (IN) .............................. 202141022484

(51) Int. Cl.
*H04W 60/04*   (2009.01)
*H04W 4/90*   (2018.01)
(Continued)

(52) U.S. Cl.
CPC ............. *H04W 60/04* (2013.01); *H04W 4/90* (2018.02); *H04W 48/18* (2013.01); *H04W 60/005* (2013.01)

(58) Field of Classification Search
CPC ....... H04W 60/04; H04W 4/90; H04W 48/18; H04W 60/005; H04W 76/50; H04W 60/00; H04W 8/12
See application file for complete search history.

(56) References Cited

U.S. PATENT DOCUMENTS 11,864,147 B2   1/2024   Chun
2022/0217805 A1*   7/2022   Niemi ................... H04W 48/20

FOREIGN PATENT DOCUMENTS

EP   3905737 A1   11/2021
WO   2020141965 A1   7/2020
(Continued)

OTHER PUBLICATIONS

Huawei et al., "Evaluation and conclusion of Solutions for KI#4", 3GPP TSG-CT WG1 Meeting #129-e, May 20-28, 2021, C1-213298, 3 pages.

(Continued)

*Primary Examiner* — Marisol Figueroa

(57) ABSTRACT

The disclosure relates to a 5G or 6G communication system for supporting a higher data transmission rate. Embodiments herein disclose methods and systems for providing services efficiently in a wireless communication network, following a disaster condition. According to various embodiments, a method performed by a user equipment (UE) connected to at least one public land mobile network (PLMN), the method comprising: identifying that a disaster condition is applied to the at least one PMLN; determining one or more PLMN among at least one available PLMN, and one or more registration type supported by the determined one or more PLMN, wherein the one or more registration type include information on a normal registration or information on a disaster roaming registration; and triggering a registration procedure based on the determined one or more registration type.

10 Claims, 6 Drawing Sheets

(51) Int. Cl.
*H04W 48/18* (2009.01)
*H04W 60/00* (2009.01)

(56) References Cited

FOREIGN PATENT DOCUMENTS

| WO | 2020/218764 A1 | 10/2020 |
|----|----------------|---------|
| WO | 2021/007447 A1 | 1/2021  |
| WO | 2021015597 A1  | 1/2021  |

OTHER PUBLICATIONS

LG Electronics, "Discussion on the result of moderated discussion", 3GPP TSG-CT WG1 Meeting #129-e, Apr. 19-23, 2021, C1-212335, 4 pages.
International Search Report dated Aug. 23, 2022 in connection with International Patent Application No. PCT/KR2022/007114, 3 pages.
Written Opinion of the International Searching Authority dated Aug. 23, 2022 in connection with International Patent Application No. PCT/KR2022/007114, 4 pages.
3GPP TS 22.261 V17.3.0 (Jul. 2020), Technical Specification, 3rd Generation Partnership Project; Technical Specification Group Services and System Aspects; Service requirements for the 5G system; Stage 1 (Release 17), Jul. 2020, 83 pages.
3GPP TS 23.122 V17.6.0 (Mar. 2022), Technical Specification, 3rd Generation Partnership Project; Technical Specification Group Core Network and Terminals; Non-Access-Stratum (NAS) functions related to Mobile Station (MS) in idle mode (Release 17), Mar. 2022, 129 pages.
3GPP TS 24.501 V17.1.0 (Dec. 2020), Technical Specification, 3rd Generation Partnership Project; Technical Specification Group Core Network and Terminals; Non-Access-Stratum (NAS) protocol for 5G System (5GS); Stage 3; (Release 17), Dec. 2020, 746 pages.
3GPP TR 24.811 V1.1.0 (Apr. 2021), Technical Report, 3rd Generation Partnership Project; Technical Specification Group Core Network and Terminals; Study on the support for minimization of service interruption; (Release 17), Apr. 2021, 99 pages.
3GPP TR 24.811 V17.1.0 (Sep. 2021), Technical Report, 3rd Generation Partnership Project; Technical Specification Group Core Network and Terminals; Study on the support for minimization of service interruption; (Release 17), Sep. 2021, 112 pages.
Supplementary European Search Report dated Jul. 4, 2024, in connection with European Application No. 22804984.7, 12 pages.

* cited by examiner

FIG. 1 [Prior Art]

METHODS AND SYSTEMS FOR MANUAL MODE SEARCH FOLLOWING A DISASTER CONDITION

CROSS REFERENCE TO RELATED APPLICATIONS

This application is based on and derives the benefit of Indian Provisional Application 202141022484, filed May 19, 2021, and Indian Complete Application 202141022484, filed Apr. 28, 2022, the contents of which are incorporated herein by reference.

BACKGROUND

1. Field

Embodiments disclosed herein relate to wireless communication networks, and more particularly to managing services in a wireless communication network, following a disaster condition.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

There are requirements that can help in avoiding service interruptions that may arise when a disaster condition (for example, a fire or an earthquake), occurs on a given public land mobile network (PLMN), and for which the user equipment (UEs) may be redirected to another PLMN in a manner that keeps the service interruption to a minimum. A mobile network may fail to provide service in the event of a disaster. These requirements can provide the fifth generation system (5GS) with the capability to mitigate the interruption of service. The UEs may obtain service in the event of a disaster, if there are PLMN operators prepared to offer service to the UEs. The minimization of service interruption may be constrained to a particular time and place.

The PLMN that is impacted by a disaster condition is also referred to as "PLMN D" herein. The PLMN that is not affected by the disaster condition and is providing disaster roaming service on behalf of PLMN D is also referred to as available PLMN or "PLMN A" herein.

SUMMARY

Accordingly, the embodiments herein provide methods and systems for providing services efficiently in a wireless communication network, following a disaster condition. A first method disclosed herein involves determining by the UE that there is a disaster condition. The disaster condition can be present in a source PLMN. The method further involves displaying, by the UE, to the user or indicating, by the UE, to the upper layers, at least one of the following:
  a. a list of available PLMN(s) in an area that the UE is located in; or
  b. the registration types supported by the available PLMN (s).

The method further involves selecting, by the user or the upper layers, at least one of the following:
  a. at least one PLMN from the available PLMN(s); or
  b. at least one registration type supported by the selected at least one PLMN.

The method further involves triggering, by the UE, to choose the selected at least one PLMN. The method further involves triggering, by the UE, to perform a registration procedure using the at least one registration type supported by the at least one PLMN, upon selection of the at least one registration type by at least one of: the user or the upper layers; and the UE. The registration types supported by the selected at least one PLMN can include normal registration and disaster roaming registration. The method further involves including, by the UE, in a registration request message a 5GS registration type value set to the registration type selected. If the registration types supported by the available PLMN(s) are not displayed to the user or the upper layers, or if the user or the upper layers do not select the at least one registration type supported by the selected at least one PLMN, then the registration type selected by the UE may indicate normal registration procedure.

A system disclosed herein comprises of at least one source PLMN, at least one target PLMN, and at least one UE. The at least one source PLMN is susceptible to becoming inoperative due to a disaster condition on it. The at least one target PLMN, which is chosen by the UE based on user or the upper layers selection, provides disaster roaming services. The at least one UE may be configured to perform at least one of the following:
  a. determine that there is a disaster condition on the at least one source PLMN;
  b. display to the user or indicate to the upper layers at least one of: a list of at least one available PLMN(s); and the registration types supported by the available PLMN(s);
  c. choose the at least one target PLMN, wherein the at least one target PLMN is among the available PLMN(s) and is selected by the user or the upper layers;
  d. choose at least one registration type that is supported by the at least one target PLMN, upon a selection of the at least one registration type by at least one of: the user or the upper layers; and the UE;
  e. trigger a registration procedure using the selected at least one registration type; or
  f. include in a registration request message a 5GS registration type value to the selected registration type.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The embodiments disclosed herein are illustrated in the accompanying drawings, throughout which like reference letters indicate corresponding parts in the various figures.

The embodiments herein will be better understood from the following description with reference to the drawings, in which.

DETAILED DESCRIPTION

Figure 1:
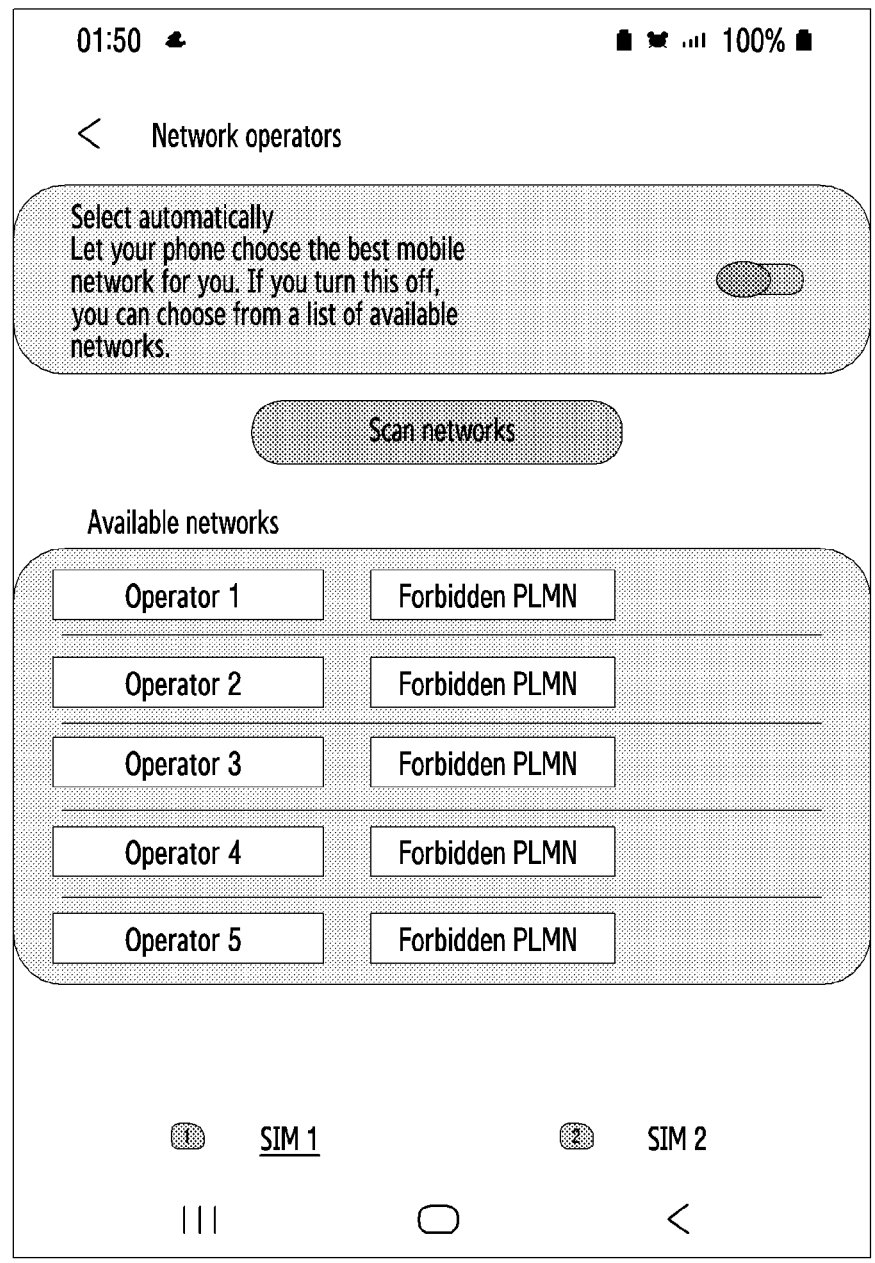
FIG. 1 illustrates an example user interface (UI) for performing manual PLMN selection according to prior arts.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments herein disclose methods and systems for providing services efficiently in a wireless communication network, following a disaster condition, wherein the UE may trigger normal registration or registration for disaster inbound roaming services (also referred to herein as "disaster roaming registration") for the target PLMN that is selected by the user or the upper layers during a Manual Network Selection Mode procedure.

The principal object of the embodiments herein is to disclose methods and systems for connecting a UE to a PLMN during Manual PLMN selection.

Another object of the embodiments disclosed herein is to disclose methods and systems for connecting a UE to a PLMN upon selection of the registration type by the UE.

When a disaster happens, the network may become unresponsive, due to which the user can go for manual PLMN selection or Manual Network Selection Mode Procedure. When the disaster condition is detected for the PLMN D, the user may be denied service, so the user may trigger a manual PLMN selection or manual network selection mode procedure.

The terms "manual PLMN selection" and "manual network selection mode procedure" have been used interchangeably to refer to a manual selection of a PLMN.

There can be several PLMNs present in the area the UE is located in, so when these PLMNs are presented to the user, the PLMNs may be categorized in manners such as "preferred PLMN," "forbidden PLMN" etc. The UE may provide an indication to the user or the upper layers on the type (category) of PLMNs and the upper layers can act on how the PLMNs can be presented to the user.

The PLMNs that support disaster roaming services may only consist of forbidden PLMNs, and if there are only forbidden PLMNs in the area, all the PLMNs may be displayed as forbidden PLMNs to the user which can be misleading and thereby prevent the user from selecting any of those forbidden PLMNs to obtain disaster roaming services.

Once all the PLMN(s) are listed to the user, the user can select any PLMN from the list and trigger registration on the selected PLMN.

However, as illustrated in FIG. 1, it is not clear whether upon selecting a PLMN, by the user or the upper layers, which may be a forbidden PLMN that may or may not support disaster roaming, if the UE may trigger normal registration or registration for disaster inbound roaming services for the selected PLMN. Moreover, there is no option provided to the user if he wants to trigger normal registration or registration for disaster inbound roaming services. The user may need the flexibility for selecting either type of registration as there may be different charges and services based on the type of registration that may be performed.

When the UE is registered on PLMN A to receive disaster inbound roaming services on behalf of PLMN D, then during manual PLMN selection, if the UE determines that the disaster condition has ended on PLMND (through any broadcast information or any access stratum (AS)/non access stratum (NAS) signaling message or via non-3GPP access), it is not clear how the UE may proceed after making such a determination.

When the user triggers a manual PLMN selection, the UE may check for all the available PLMN(s) in the area that the UE is located in. If the UE does not find any allowable PLMN(s) and finds only forbidden PLMN(s), the UE can determine (for example, by any broadcast information), if any of the forbidden PLMN(s) supports disaster inbound roaming services for the UE. The UE can send an indication to the upper layers with the PLMN ID(s) for all such PLMN(s) that support disaster inbound roaming services for the UE.

Optionally, the UE can additionally send an indication to the upper layers with the PLMN ID(s) of the PLMN A that support disaster roaming services on behalf of PLMN D.

During manual PLMN selection, possibilities of information provided to the user or the upper layers from any of the NAS or AS layers are listed below:

i) The user can be notified with a list of PLMN—As which support disaster inbound roaming;

ii) The user can be notified with a list of PLMN—As which do not support disaster inbound roaming; i.e., the list of PLMN—As are only forbidden PLMNs and UE determines that the list of PLMN—As do not support the disaster inbound roaming service for any of the PLMN-Ds or optionally the list of PLMN—As do support disaster inbound roaming service, but the PLMN-D for which the list of PLMN—As are supporting disaster inbound roaming service is part of a forbidden PLMN list in the UE;

iii) The user can be notified with a list of PLMN-Ds, which are the PLMNs impacted by the disaster condition; and/or iv) The user can be notified with a list including each PLMN-A that is providing disaster roaming service on behalf of each PLMN-D.

In some embodiments, upon selection, by a user, of a PLMN offering disaster roaming services (PLMN-A) in the above list, the UE may also provide the user with an option to select at least one registration type to be performed on the user-selected PLMN (PLMN-A). Examples of the at least one registration type can be normal registration or disaster roaming registration. Following the user selection of the PLMN and the registration type, the UE may trigger the selection of the user-selected PLMN and perform a registration procedure using the user-selected registration type. In other embodiments, the upper layers may perform the selection of the PLMN offering disaster roaming services and the registration type, in which case the UE triggers the selection of the PLMN selected by the upper layers and performs a registration procedure on the selected PLMN using the registration type selected by the upper layers.

In the embodiments where upon selection of PLMN A, the user is provided with the option to select a registration type on the selected PLMN A, the UE may perform a registration procedure using the selected registration type.

If the registration type is disaster roaming registration, then the UE may perform the registration procedure using disaster roaming registration. The UE may also include in a registration request message a 5GS registration type value set to the disaster roaming registration, to indicate that disaster roaming registration was performed. Examples of types of disaster roaming registration include "disaster roaming initial registration" and "disaster roaming mobility registration update."

If the registration type is normal registration, then the UE may perform a registration procedure using normal registration on the PLMN-A. Examples of normal registration can include initial registration, mobility registration updating, periodic registration updating, emergency registration, and stand-alone non-public network (SNPN) onboarding registration. The UE may include in the registration request message the 5GS registration type value to the normal registration to indicate that normal registration was performed.

In some embodiments, upon selection of the PLMN A by the user or the upper layers, there may not be an option provided/displayed to the user or indicated to the upper layers to select the registration type on the selected PLMN A. Optionally, the user or the upper layers may not select any registration type while selecting the PLMN A. When there is no option for selecting a registration type or if the user or the upper layers have not selected any registration type for the selected PLMN A, the UE may select a registration type similar to normal registration and the UE may perform a registration procedure using normal registration on the PLMN-A. Examples of normal registration can include initial registration, mobility registration updating, periodic registration updating, emergency registration, and stand-alone non-public network (SNPN) onboarding registration. The UE may include in the registration request message the 5GS registration type value to the normal registration to indicate that normal registration was performed.

In some embodiments, when the user is displayed or the upper layers are indicated the list of available PLMN by the UE, and if the user or the upper layers select a PLMN that is not offering disaster roaming services, the UE may then perform a normal registration on the selected PLMN.

In some embodiments, when the UE is registered on PLMN A for disaster inbound roaming services for PLMN D in Manual PLMN Selection mode, the UE may trigger a higher priority PLMN search. Optionally, the UE may trigger the higher priority PLMN search with a different or modified search timer, wherein this search may include searching for the PLMN-D. In another embodiment, the higher priority PLMN search may not include searching for the PLMN-D for which the UE is registered on the PLMN-A for disaster roaming services.

During the higher priority PLMN search or through any broadcast information or through any access stratum (AS)/non-access stratum (NAS) signaling or via non-3GPP access, if the UE determines that the disaster condition on the PLMN-D is no longer applicable, due to which the UE was registered on PLMN-A, or if the UE determines that another PLMN is available to provide normal service to the UE, then the UE may perform at least one of the following:

a. Indicate to the upper layers and/or the user that the disaster condition on PLMN-D is no longer applicable, and may also indicate to the upper layers and/or user to trigger a manual network selection mode procedure or automatic PLMN selection or automatic network selection mode procedure again; and b. Indicate the PLMN ID of the PLMN-D due to which the UE was registered on PLMN-A that was offering disaster roaming services, or the PLMN ID of any other available PLMN that is offering normal service to the UE, as available or allowable for registration.

In another embodiment, the UE may trigger a PLMN search, and the UE may check for all the available PLMNs in that area. The UE may send the updated PLMN list for all the available PLMNs to the upper layers and/or the user.

In another embodiment, if the user had selected PLMN-D, but due to the disaster condition on PLMN-D had selected PLMN-A which was providing disaster roaming services on behalf of PLMN-D, the UE may select and register on the PLMN-D once the disaster condition on the PLMN-D is no longer applicable even though UE is in manual mode and the user had selected the PLMN-A.

Figure 2:
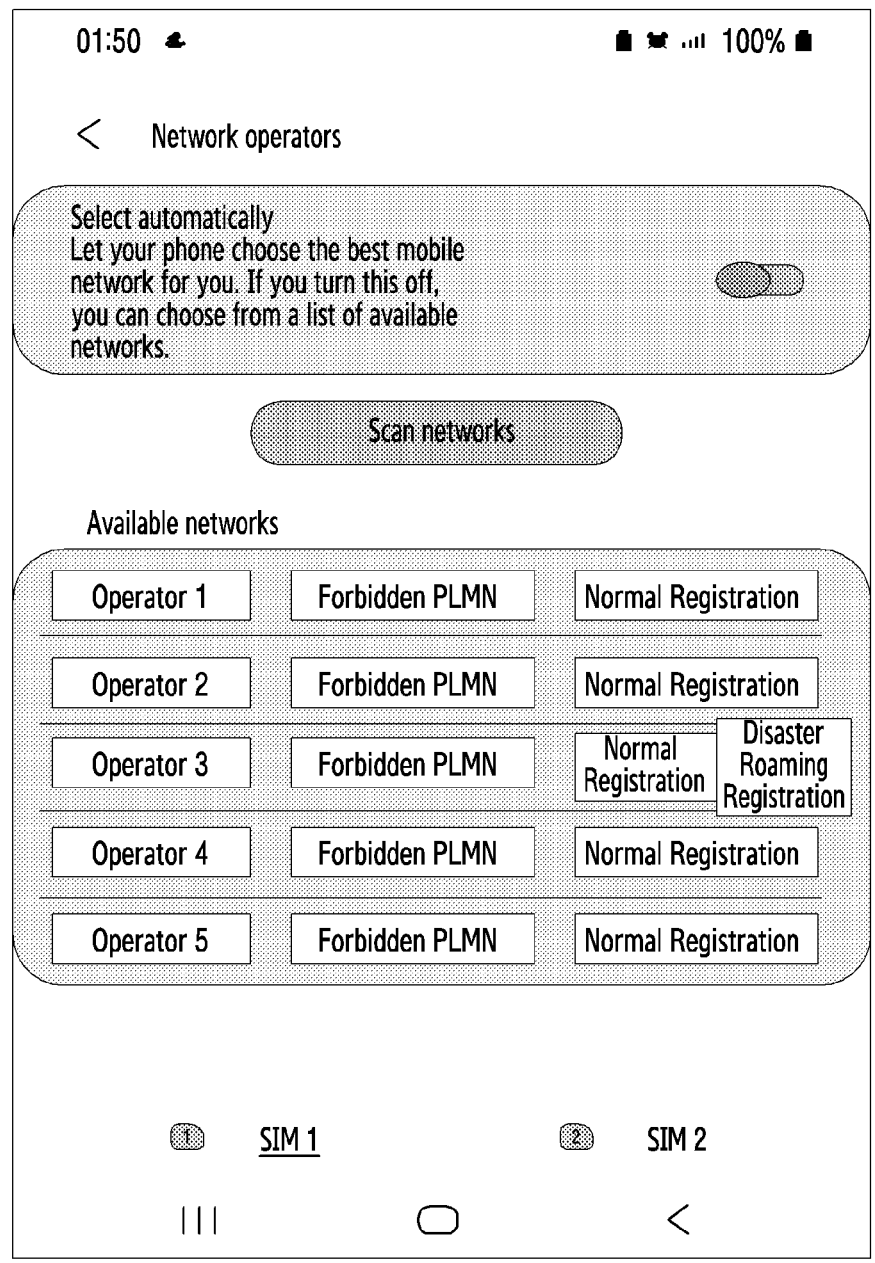
FIG. 2 illustrates an example user interface (UI) for performing manual selection of PLMN and registration type according to embodiments as disclosed herein.
Figure 3:
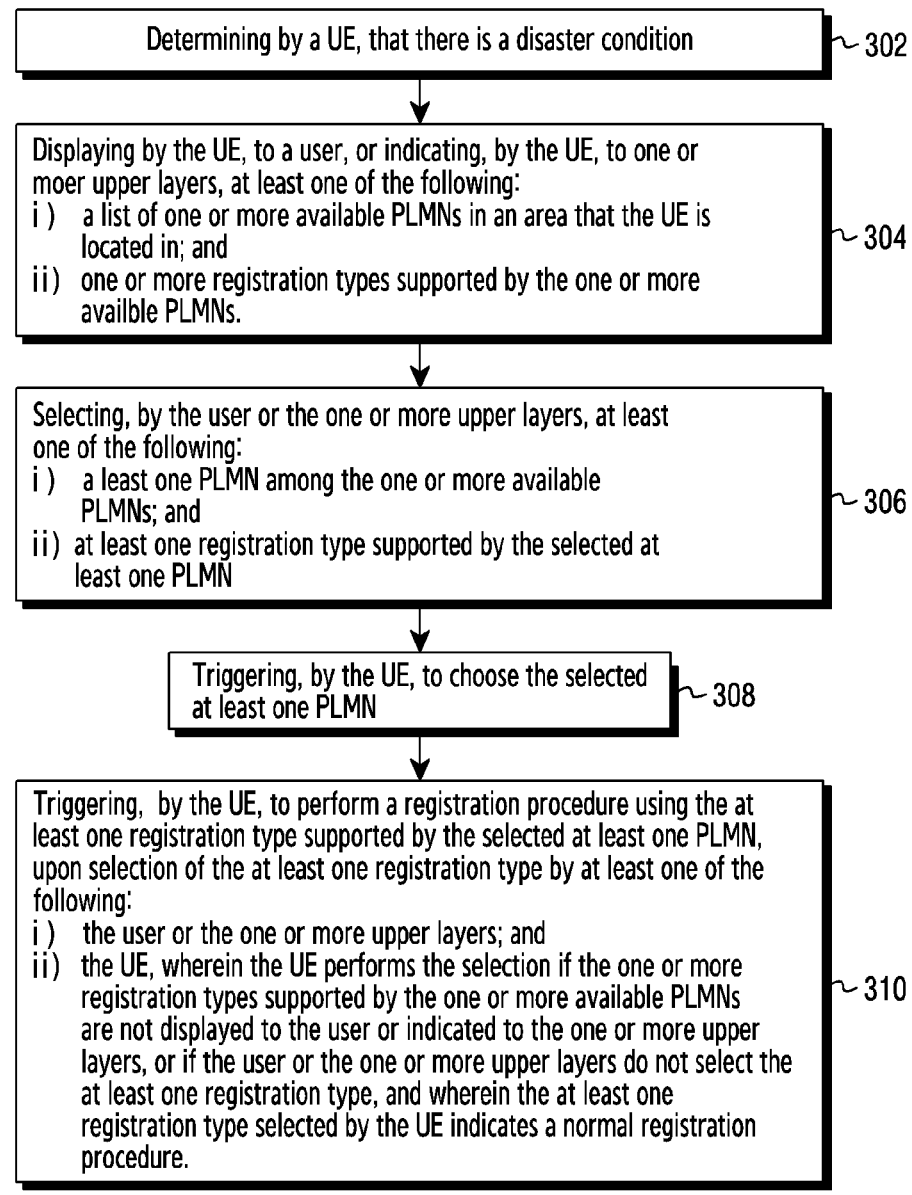
FIG. 3 illustrates a method for connecting a UE to a PLMN during Manual PLMN selection according to embodiments as disclosed herein.
Figure 4:
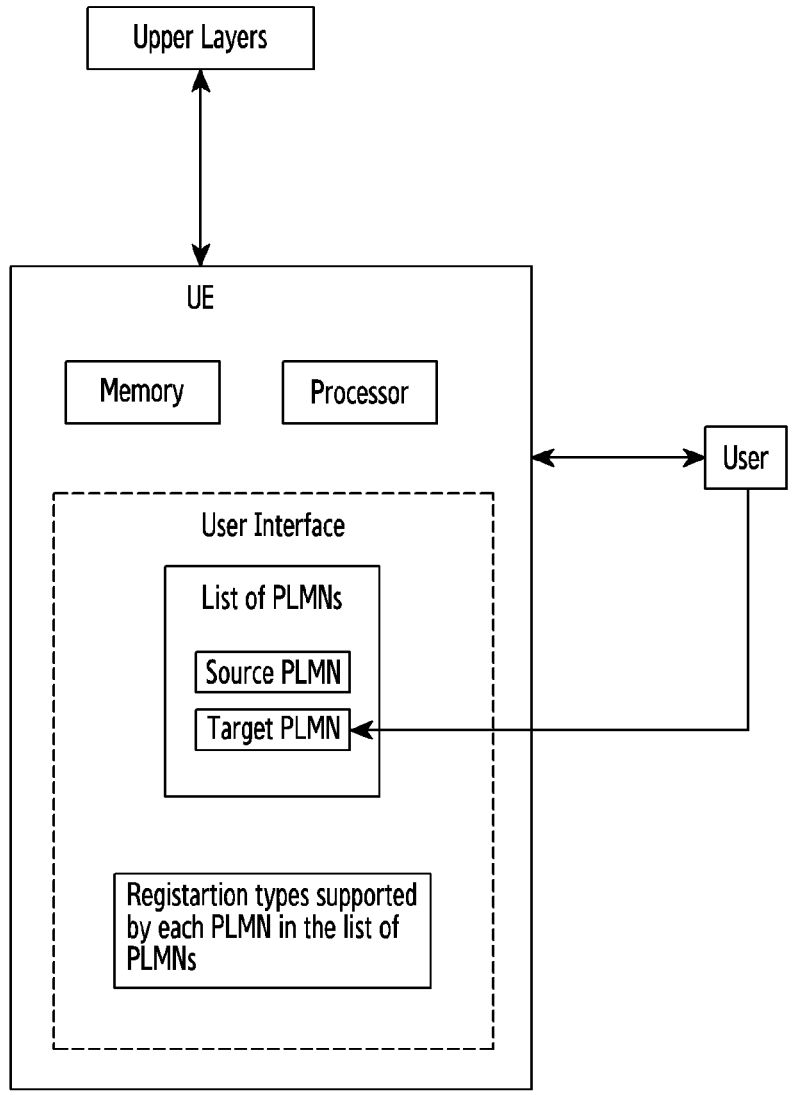
FIG. 4 illustrates a system for facilitating manual selection of PLMN and registration type, according to embodiments as disclosed herein.

Referring now to the drawings, and more particularly to FIGS. 2 through 4, where similar reference characters denote corresponding features consistently throughout the figures, there are shown embodiments.

FIG. 2 illustrates an example user interface (UI) for performing manual selection of PLMN and registration type according to embodiments as disclosed herein. When the user decides to perform a manual PLMN selection, a list of available PLMNs may be displayed to the user. In FIG. 2, the user interface (UI) depicts the available PLMN as "Operator 1," "Operator 2," "Operator 3," "Operator 4," and "Operator 5." The UI may also indicate which of the available PLMNs belong to a forbidden PLMN list. The UI may also indicate to the user what registration type may be selected on any of the available PLMNs. While FIG. 2 illustrates that the possible registration types include normal registration and disaster roaming registration, it is to be construed as non-limiting as the available PLMNs may allow selection for additional registration types.

FIG. 3 illustrates a method 300 for connecting a UE to a PLMN during Manual PLMN selection according to embodiments as disclosed herein.

At step 302, the UE may determine that there is a disaster condition. The disaster condition may be on a source PLMN, which may be the UE's HPLMN or a VPLMN or any allowable PLMN of the UE and not part of the Forbidden PLMN list of the UE.

At step 304, the UE may display to the user or indicate to the upper layers a list of the available PLMN(s) in an area that the UE is located in. The UE may additionally display to the user or indicate to the upper layers, one or more registration types supported by the one or more available PLMNs.

At step 306, the user or the upper layers may select at least one PLMN among the available PLMN(s). The user or the upper layers may also select at least one registration type that is supported by the selected at least one PLMN.

At step 308, the UE may be triggered to the choose the selected at least one PLMN.

At step 310, the UE may be triggered to perform a registration procedure using the at least one registration type supported by the selected at least one PLMN, upon selection of the at least one registration type by the user or the upper layers. In some embodiments, if the registration types are not indicated or displayed to the user or the upper layers or if the user or the upper layers do not select the at least one registration type, the UE may select the at least one registration type. The UE-selected at least one registration type may indicate a normal registration procedure.

The various actions in method 300 may be performed in the order presented, in a different order or simultaneously. Further, in some embodiments, some actions listed in FIG. 3 may be omitted.

FIG. 4 illustrates a system for facilitating manual selection of PLMN and registration type according to embodiments as disclosed herein.

The system may comprise a UE comprising a memory and a processor. The memory may store one or more instructions that when executed by the processor, result in the performance of the actions by the UE as previously described herein. The UE may display to the user (through the UE's UI) or the upper layers a list of PLMNs that the UE may be configured with. This list may include the source PLMN (an example of which is UE's HPLMN or a VPLMN) and the target PLMN. The target PLMN can be the PLMN selected by the user or the upper layers, wherein the target PLMN may offer disaster roaming services to the UE when the source PLMN is impacted by a disaster condition. In other embodiments, the list of PLMNs may also include all the available PLMN(s) in an area that the UE is located in. The list of PLMNs may also include the PLMNs accepting disaster roaming services, not accepting disaster roaming services, and any forbidden PLMNs. The UE may also display to the user (through the UE's UI) or the upper layers the registration types supported by the list of the PLMNs (a few examples of which are normal registration and disaster roaming registration).

Through the UI of the UE, the user may be able to provide inputs to the UE. One example of an input that can be provided to the UE can be selection of a PLMN during Manual Network Selection Mode. Another example of an input can be the selection of a registration type to be performed on the selected PLMN.

Figure 5:
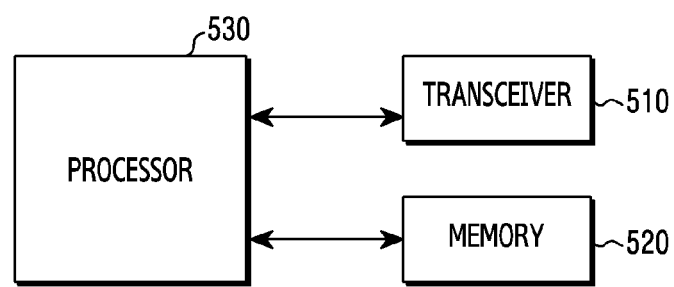
FIG. 5 illustrates a block diagram illustrating a structure of a UE according to embodiments of the disclosure.

FIG. 5 illustrates a block diagram illustrating a structure of a UE according to an embodiment of the disclosure. FIG. 5 corresponds to the example of the UE of FIG. 4.

As shown in FIG. 5, the UE according to an embodiment may include a transceiver 510, a memory 520, and a processor 530. The transceiver 510, the memory 520, and the processor 530 of the UE may operate according to a communication method of the UE described above. However, the components of the UE are not limited thereto. For example, the UE may include more or fewer components than those described above. In addition, the processor 530, the transceiver 510, and the memory 520 may be implemented as a single chip. Also, the processor 530 may include at least one processor.

The transceiver 510 collectively refers to a UE receiver and a UE transmitter, and may transmit/receive a signal to/from a base station or a network entity. The signal transmitted or received to or from the base station or a network entity may include control information and data. The transceiver 510 may include a RF transmitter for up-converting and amplifying a frequency of a transmitted signal, and a RF receiver for amplifying low-noise and down-converting a frequency of a received signal. However, this is only an example of the transceiver 510 and components of the transceiver 510 are not limited to the RF transmitter and the RF receiver.

Also, the transceiver 510 may receive and output, to the processor 530, a signal through a wireless channel, and transmit a signal output from the processor 530 through the wireless channel.

The memory 520 may store a program and data required for operations of the UE. Also, the memory 520 may store control information or data included in a signal obtained by the UE. The memory 520 may be a storage medium, such as read-only memory (ROM), random access memory (RAM), a hard disk, a CD-ROM, and a DVD, or a combination of storage media.

The processor 530 may control a series of processes such that the UE operates as described above. For example, the transceiver 510 may receive a data signal including a control signal transmitted by the base station or the network entity, and the processor 530 may determine a result of receiving the control signal and the data signal transmitted by the base station or the network entity.

Figure 6:
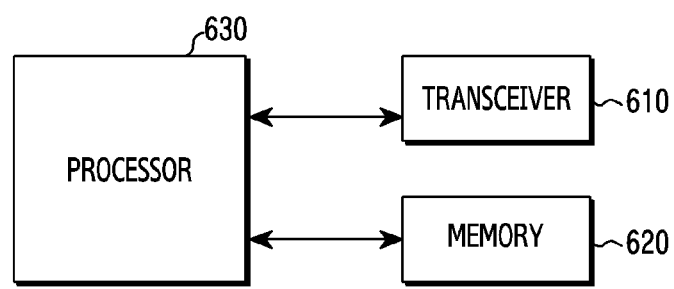
FIG. 6 illustrates a block diagram illustrating a structure of a base station according to embodiments of the disclosure.

Although not illustrated in FIG. 6, the UE may include one or more upper layers. One or more upper layers included in the UE may operate as one unit. One or more upper layers included in the UE may operate like a processor of the UE.

FIG. 6 illustrates a block diagram illustrating a structure of a base station according to an embodiment of the disclosure.

As shown in FIG. 6, the base station according to an embodiment may include a transceiver 610, a memory 620, and a processor 630. The transceiver 610, the memory 620, and the processor 630 of the base station may operate according to a communication method of the base station described above. However, the components of the base station are not limited thereto. For example, the base station may include more or fewer components than those described above. In addition, the processor 630, the transceiver 610, and the memory 620 may be implemented as a single chip. Also, the processor 630 may include at least one processor.

The transceiver 610 collectively refers to a base station receiver and a base station transmitter, and may transmit/receive a signal to/from a terminal or a network entity. The signal transmitted or received to or from the terminal or a network entity may include control information and data. The transceiver 610 may include a RF transmitter for up-converting and amplifying a frequency of a transmitted signal, and a RF receiver for amplifying low-noise and down-converting a frequency of a received signal. However, this is only an example of the transceiver 610 and components of the transceiver 610 are not limited to the RF transmitter and the RF receiver.

Also, the transceiver 610 may receive and output, to the processor 630, a signal through a wireless channel, and transmit a signal output from the processor 630 through the wireless channel.

The memory 620 may store a program and data required for operations of the base station. Also, the memory 620 may store control information or data included in a signal obtained by the base station. The memory 620 may be a storage medium, such as read-only memory (ROM), random access memory (RAM), a hard disk, a CD-ROM, and a DVD, or a combination of storage media.

The processor 630 may control a series of processes such that the base station operates as described above. For example, the transceiver 610 may receive a data signal including a control signal transmitted by the terminal, and the processor 630 may determine a result of receiving the control signal and the data signal transmitted by the terminal.

Although the present disclosure has been described with an exemplary embodiment, various changes and modifications may be suggested to one skilled in the art. It is intended that the present disclosure encompass such changes and modifications as fall within the scope of the appended claims. None of the description in this application may be read as implying that any particular element, step, or function is an essential element that must be included in the claims scope. The scope of patented subject matter is defined by the claims.

The embodiments disclosed herein may refer to "PLMN A" and "target PLMN" interchangeably to refer to the selected PLMN that supports disaster roaming services. The embodiments disclosed herein may refer to "PLMN D" and "source PLMN" interchangeably to refer to the PLMN that is impacted by the disaster condition.

According to various embodiments, a method performed by a user equipment (UE) connected to at least one public land mobile network (PLMN), the method comprising: identifying that a disaster condition is applied to the at least one PMLN; determining one or more PLMN among at least one available PLMN, and one or more registration type supported by the determined one or more PLMN, wherein the one or more registration type include information on a normal registration or information on a disaster roaming registration; and triggering a registration procedure based on the determined one or more registration type.

In some embodiments, wherein a list of the at least one available PLMNs includes at least one of: at least one PLMN that supports disaster roaming services; at least one PLMN that does not support disaster roaming services; at least one PLMN affected by the disaster condition; or at least one PLMN providing disaster roaming services for each PLMN of the at least one PLMN affected by the disaster condition.

In some embodiments, wherein the information on the normal registration includes at least one of: an initial registration; a mobility registration update; a periodic registration update; an emergency registration; or a stand-alone non-public network (SNPN) onboarding registration.

In some embodiments, wherein the information on the disaster roaming registration includes at least one of: a disaster roaming initial registration; or a disaster roaming mobility registration update.

In some embodiments, the method further comprising: indicating to one or more upper layers of the UE at least one of: a list of the at least one available PLMN in an area in which the UE is located, or at least one registration types supported by the at least one available PLMN; determining, by the one or more upper layers of the UE, at least one of: the one or more PLMN among the at least one available PLMN, and the one or more registration type supported by the determined one or more PLMN; and triggering, by the one or more upper layers of the UE, a registration procedure based on the one or more registration type.

In some embodiments, wherein the one or more registration type includes at least one of: an initial registration; a mobility registration update; a periodic registration update; an emergency registration; or a stand-alone non-public network (SNPN) onboarding registration.

According to various embodiments, a user equipment (UE) connected to at least one source public land mobile network (PLMN), the UE comprising: at least one transceiver; and at least one processor operably coupled with the at least one transceiver, the at least one processor configured to: identify that a disaster condition is applied to the at least one PLMN, determine one or more PLMN among at least one available PLMN, and one or more registration type supported by the determined one or more PLMN, wherein the one or more registration type include information on a normal registration or information on a disaster roaming registration; and trigger a registration procedure based on the determined one or more registration type.

In some embodiments, wherein a list of the at least one available PLMNs include at least one of: at least one PLMN that supports disaster roaming services; at least one PLMN that does not support disaster roaming services; at least one PLMN affected by the disaster condition; or at least one PLMN providing disaster roaming services for each PLMN of the at least one PLMN affected by the disaster condition.

In some embodiments, wherein the information on the normal registration includes at least one of: an initial registration; a mobility registration update; a periodic registration update; an emergency registration; or a stand-alone non-public network (SNPN) onboarding registration.

In some embodiments, wherein the information on the disaster roaming registration includes at least one of: a disaster roaming initial registration; or a disaster roaming mobility registration update.

In some embodiments, wherein the normal registration comprises including, by the UE, in the registration request message the 5GS registration type value set to at least one of the following: initial registration; mobility registration updating; periodic registration updating; emergency registration; and stand-alone non-public network (SNPN) onboarding registration.

In some embodiments, the at least one processor further configured to: indicate to one or more upper layers of the UE at least one of: a list of the at least one available PLMN in an area in which the UE is located, or at least one registration types supported by the at least one available PLMN; determine, by the one or more upper layers of the UE, at least one of: the one or more PLMN among the at least one available PLMN, and the one or more registration type supported by the determined one or more PLMN; and trigger, by the one or more upper layers of the UE, a registration procedure based on the one or more registration type.

In some embodiments, wherein the one or more registration type includes at least one of: an initial registration; a mobility registration update; a periodic registration update; an emergency registration; or a stand-alone non-public network (SNPN) onboarding registration.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

The invention claimed is:

1. A method performed by a user equipment (UE) in a wireless communication system, the method comprising:
   identifying that a disaster condition is applied to a first public land mobile network (PLMN);
   identifying a second PLMN among available PLMNs by a manual selection;
   when that a value of a registration type for the second PLMN is included in a command for the manual selection and indicates a disaster roaming service, triggering a first registration procedure for the disaster roaming service;
   when the value of the registration type for the second PLMN is included in the command for the manual selection and indicates a normal registration, triggering a second registration procedure for the normal registration; and
   when the value of a registration type for the second PLMN is not included in the command for the manual selection, triggering the second registration procedure for the normal registration.

2. The method of claim 1, wherein the available PLMNs include at least one of:
   at least one PLMN that supports disaster roaming services;
   at least one PLMN that does not support disaster roaming services;
   at least one PLMN affected by the disaster condition; or
   at least one PLMN providing disaster roaming services for each PLMN of the at least one PLMN affected by the disaster condition.

3. The method of claim 1, wherein the normal registration includes at least one of:
   an initial registration;
   a mobility registration update;
   a periodic registration update;
   an emergency registration; or
   a stand-alone non-public network (SNPN) onboarding registration.

4. The method of claim 1, wherein a disaster roaming registration includes at least one of:
   a disaster roaming initial registration; or
   a disaster roaming mobility registration update.

5. The method of claim 1, further comprising:
   when the first registration procedure for the disaster roaming service is performed, transmitting a registration request message including information on the registration type.

6. A user equipment (UE) in a wireless communication system, the UE comprising:
   a transceiver; and
   a controller coupled with the transceiver and configured to:
      identify that a disaster condition is applied to a first public land mobile network (PLMN),
      identify a second PLMN among available PLMNs by a manual selection,
      when a value of a registration type for the second PLMN is included in a command for the manual selection and indicates a disaster roaming service, trigger a first registration procedure for the disaster roaming service,
      when the value of the registration type for the second PLMN is included in the command for the manual selection and indicates a normal registration, trigger a second registration procedure for the normal registration, and
      when the value of a registration type for the second PLMN is not included in the command for the manual selection, trigger the second registration procedure for the normal registration.

7. The UE of claim 6, wherein the available PLMNs include at least one of:
   at least one PLMN that supports disaster roaming services;
   at least one PLMN that does not support disaster roaming services;
   at least one PLMN affected by the disaster condition; or
   at least one PLMN providing disaster roaming services for each PLMN of the at least one PLMN affected by the disaster condition.

8. The UE of claim 6, wherein the normal registration includes at least one of:
   an initial registration;
   a mobility registration update;
   a periodic registration update;
   an emergency registration; or
   a stand-alone non-public network (SNPN) onboarding registration.

9. The UE of claim 6, wherein a disaster roaming registration includes at least one of:
   a disaster roaming initial registration; or
   a disaster roaming mobility registration update.

10. The UE of claim 6, the at least one processor controller is further configured to:
    when the first registration procedure for the disaster roaming service is performed, transmit a registration request message including information on the registration type.

* * * * *